May 17, 1960  P. G. ROHLAND  2,936,499
CABLE CLAMP FOR JOINING AND HOLDING WIRE CABLES
AND END LOOPS THEREOF
Filed April 24, 1957
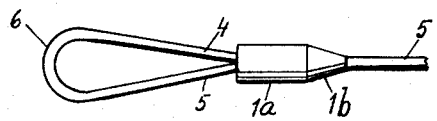
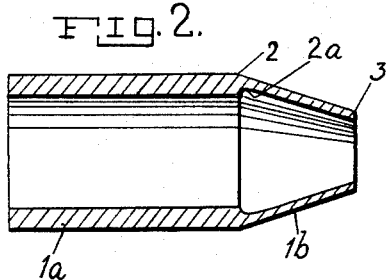 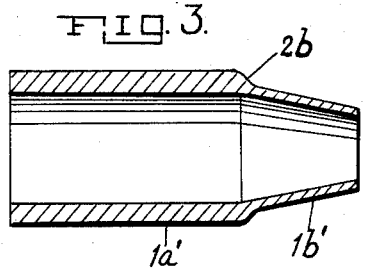
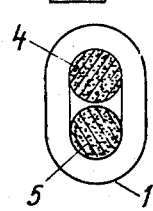 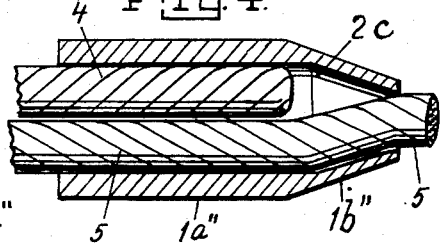 
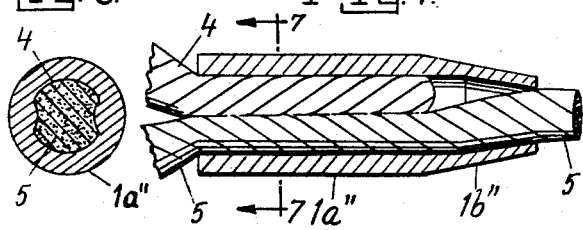 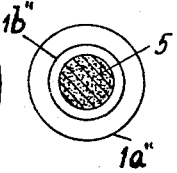
INVENTOR.
P. G. Rohland
BY
Glascock Downing Seebold
ATTYS.

United States Patent Office 2,936,499
Patented May 17, 1960

2,936,499

CABLE CLAMP FOR JOINING AND HOLDING WIRE CABLES AND END LOOPS THEREOF

Paul Gerhard Rohland, Goteborg, Sweden

Application April 24, 1957, Serial No. 654,839

Claims priority, application Sweden March 18, 1957

3 Claims. (Cl. 24—130)

This invention relates to a method and means for joining wire cables and for holding end loops formed in such cables with the use of cable clamps which are to be undetachably pressed onto the cable joints under a very high pressure by a machine press or a swaging machine, and which are intended to be exposed to very great load stresses, for instance, in cranes on shipyards, quays and ships. Such cable clamps in the shape of straight metal sleeves with square-cut ends have come into great practical use consisting of a metal composition of a certain softness and will, under the compression around two overlapping cable courses of the joint, undergo a very great deformation and at the end of the compressing reach a great hardness and holding strength. There is a definite need for this kind of clamp where the clamp at least at the one end where the single load-bearing course of the cable passes out is provided with a tapered end to give this cable a center outlet as well as to avoid the possibility of a sharp bend of the cable at the end of the clamp body itself where the strong pressure on the bearing cable portion suddenly ceases.

The main object of the invention is to provide a method and means for forming and holding end loops in cables with the use of a clamp body in the shape of a sleeve with generally elliptical cross section pre-formed with a tapered end with a center outlet, the end cone in such an arrangement being constructed and arranged whereby during the strong compression of the clamp body to grip around the cable joint the end cone will require only a minor compression action to bring its base connection in smooth conformity with the strongly deformed clamp body.

A further object of the invention is to provide method and means for joining wire cables and holding end loops in such cables with the use of a clamp body provided with a tapered end with a center outlet, the end cone being of such design that the same as a direct extension from the clamp body will, after the strong compression and deformation of the clamp body around the cable joint, show a straight hollow cone form essentially without any radical change of the cone wall thickness.

A further object of the invention is to provide a cable clamp with a pre-tapered end for cable joints and for holding loops in cables, which end cone directly extends from that cross section of the clamp body where the strong compression on the outgoing single load-carrying cable portion stops suddenly and has a tendency there to cause weak points on the cable strands, said end cone being of such a shape that the same will, after the compression of the clamp, show a hollow room wide enough for a free-lying of the cable portion which cone room as a guide for the cable to a center outlet prevents a dangerous bending of the cable at said weak points of the cable strands.

With these and other objects in view the invention essentially consists of a sleeve-shaped cable clamp with a flattened elliptical cross section, the clamp body being provided with a directly extending pre-formed straight end cone with an essentially thinner wall thickness than the thickness of the clamp body.

In the accompanying drawing:

Figure 1 is a side view of the cable clamp in use on the cable.

Figures 2 and 3 two longitudinal diametral sections of the cable clamp in two different embodiments.

Figure 4 is a longitudinal diametrical section of the clamp in a further embodiment with the cable courses inserted but before the compression, and Figures 5 and 6 are end views thereof.

Figure 7 is a longitudinal diametrical section of the clamp in Figure 4 after the compression.

Figure 8 is a section taken along the line 7—7 of Fig. 7, and

Figure 9 an end view of the same.

The cable clamp is made of a metal tubular sleeve and consists of a straight clamp body 1a with a flattened elliptical cross section, which clamp body is at least at the one end provided with a direct extension in the shape of a straight tapered end 1b with a central outlet. The clamp body has throughout its entire length on the base of the end cone 3 the same cross sectional shape provided with a predetermined wall thickness, but the straight end cone has, in contrast thereto and according to the invention, an essentially thinner wall thickness substantially along its main length. The end cone changes its elliptical base section 2 continuously to a circular section at the outer end thereof, the latter lying in co-axial position along the center-line of the clamp body. This clamp body is the portion of the clamp that is to be used as the holding part for the two strands or members 4 and 5 of the cable which overlap each other within this clamp body and form in the preferred embodiment a loop 6 lying outside of the other end of the clamp. The clamp body is in a known manner intended to be compressed under strong pressure and deformation to a circular cross section by the use of a very high machine pressure causing at first the clamp body metal to flow into the spaces between the wire strands of the cable, and then to cause the clamp body at the end of the compression operation to grip around the two cable members with a very great strength and hardness. The end cone, however, will under the pressure undergo a certain change to follow the clamp body deformation at the base of the cone with a smooth surface extending from the outer and inner surfaces of the clamp body. The said change of the cone will be such that its wall thickness will be maintained substantially unchanged for its main length, and for this purpose is subjected to a successively decreasing pressure effect towards the outer end. Exactly at this outer end it is, however, preferred to close the outlet opening around the outgoing single load-bearing cable portion 5 in a watertight manner by a slight pressure leaving the wire strands unaffected. On account of the thinness of the cone wall the compression will change the inner volume of the end cone only in a small degree allowing the single cable 5 to be disposed in a free-lying position within the cone onto the cone outlet where the single cable is held watertight under a slight pressure and where no weakening points of the cable strands exist.

The wall of the end cone may, at the connection with the greater wall thickness of the clamp body itself, have different shapes. In the embodiment of Fig. 2 the wall reducing is made as a cutout 2a in the inner surface of the thicker wall 1a, and in the embodiment of Fig. 3 the wall reducing is made as a cutout 2b in the outside surface of said thicker wall. These shapes may, however, be deemed as two extreme examples as cutouts in the thicker wall naturally can be made simultaneously in both surfaces. In the embodiment of Fig. 4 the cutout in the inside surface is modified to an angle corner 2c between the inside surface of the clamp body and that of the end cone, as said inner surface of the clamp body is extended to meet the inner surface of the cone more forward than the meeting of the corresponding outer surfaces. As mentioned above it is of advantage to carry through the deformation of the clamp at the base of the cone in such a way that the surfaces of the clamp body in its finished state around the cable courses will have a smooth surface merging into the surfaces of the end cone, as shown in Fig. 7.

It may be now understood that I have provided a method and means for holding securely two courses, for instance, from a loop formed on the end of a cable able to withstand the greatest stresses, said means being in the shape of a cable clamp pre-formed with a straight end cone with an essentially thinner wall than the wall of the clamp body itself, and with a tapered outer surface as well as a tapered inner surface, which conical surfaces are directly extending from the corresponding surfaces of the clamp body onto the outlet of the clamp. This pre-formed cable clamp is strongly compressed onto the two courses of the cable, the effect of this pressure being successively reduced from the base of the cone towards the outer end of the same transforming the cone to a smaller cone angle without any radical changing of its wall thickness, the compressing operation preferably closing both ends of the clamp watertightly around the cable portions, leaving the portion of the single cable free-lying within the cone room.

The transforming of the end cone during the compressing operation may also be simplified in such a way that the main direction of the cone wall is maintained although the base of the cone will, as before, follow the compression deformation of the clamp body. Thus the flattened elliptical cross section of the cone may in this case be unchanged in a certain degree with a smooth surface connection between the clamp body and the cone.

I reserve the right to all such changes and modifications as fall within the principles of my invention and the scope of the appended claims.

I claim:

1. A cable clamp comprising a tubular sleeve having a predetermined wall thickness and defining a straight clamp body adapted to receive the end of a cable doubled over within said clamp body to form a cable loop, said clamp body having a uniform substantially elliptical cross section and being lengthened by a hollow conical end at the one end of and in one piece with the clamp body, said conical end including a cable outlet coaxially arranged with respect to said clamp body, said conical end being provided with an essentially thinner wall in comparison with said predetermined wall thickness of said clamp body, the thinness of the cone wall being executed in full degree immediately at the base of the cone at the end of said clamp body, said conical end showing cone shape at its inner surface as well as at its outer surface and being constructed and arranged whereby only the outlet portion of said conical end contacts a cable around its periphery when extending through said conical end.

2. A cable clamp according to claim 1, wherein said wall of said conical end piece is uniform in thickness throughout its entire length.

3. A cable clamp according to claim 1, wherein reduction of the wall thickness of said conical end piece is effectuated by a tapering of the outer surface of said clamp body adjacent the base of said end piece in conformity with the outer surface of said conical end piece.

References Cited in the file of this patent

UNITED STATES PATENTS

| | | |
|---|---|---|
| 2,346,412 | Bratz | Apr. 11, 1944 |
| 2,526,740 | Gilmore | Oct. 24, 1950 |
| 2,849,771 | Rohland | Sept. 2, 1958 |

FOREIGN PATENTS

| | | |
|---|---|---|
| 77,915 | Denmark | July 19, 1954 |
| 718,602 | Great Britain | Nov. 17, 1954 |